United States Patent
Gelfenbain

[19]

[11] Patent Number: 5,936,636
[45] Date of Patent: *Aug. 10, 1999

[54] ENCODING SCHEMES

[75] Inventor: Alexander D. Gelfenbain, Mountain View, Calif.

[73] Assignee: Sun Microsystems, Inc., Mountain View, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/648,779

[22] Filed: May 16, 1996

[51] Int. Cl.⁶ .................................................. G06F 15/00
[52] U.S. Cl. ............................................................ 345/467
[58] Field of Search ........................... 707/542; 345/467, 345/468, 469

[56] References Cited

U.S. PATENT DOCUMENTS 5,528,742  6/1996  Moore et al. .......................... 707/542
5,617,525  4/1997  Sugaya ................................... 707/542

OTHER PUBLICATIONS

Robert W. Scheifler and James Gettys, "X Window System", third edition, (Digital Press 1992), pp. 359–360 and pp. 346–349.

*Primary Examiner*—Phu K. Nguyen
*Attorney, Agent, or Firm*—Townsend and Townsend and Crew LLP

[57] ABSTRACT

Translation between a character encoding scheme used by an application and a font encoding scheme used by a character drawing routine may be controlled dynamically so as to accommodate multiple possible font encoding schemes. Accordingly, the range of usable fonts is greatly expanded since more than a single font encoding scheme is supported for a given locale. The process of purchasing and installing new fonts is significantly simplified since any font encoding scheme may be supported.

18 Claims, 4 Drawing Sheets

```
XLC_FONTSET
fs0 {
        charset    ISO8859-1:GL
        font       ISO8859-5:GL; KOI-8:GL; MS-1251:GL;\
                   IBM-866:GL: APPLE-STANDARDCYRILLIC:GL\
                   ISO8859-1:GL;

}
fs1 {
        charset    ISO8859-1:GR=isolatcyr
        font       ISO8859-5:GR; KOI-8:GR=-koi8; MS-
1251:GR=ms1251;\
                   IBM-866:GR=ibm866: APPLE-
                   STANDARDCYRILLIC:GR=asce
}
```

ENCODING SCHEMES

BACKGROUND OF THE INVENTION

The present invention relates to the preparation of character information for display in a computer system, and more particularly to dynamic selection of a font encoding scheme based on font availability.

A computer application that generates characters for display provides information to a character drawing routine specifying the character to be displayed and the font. Often the font will be selected in advance. The information specifying the character will typically include a numeric index identifying the character in accordance with a particular character encoding scheme specified by the current locale. For example, 'A' might be represented as 65, 'B' might be represented as 66 and so on.

The font will typically be specified by a font name. In an X Window system environment font naming is defined by the X Logical Font Description convention, known as XLFD.

"-adobe-symbol-medium-r-normal—0-0-0-0-p-0-adobe-fontspecific";

"-b&h-lucida-bold-r-normal-sans-0-0-0-0-m-0-iso8859-5"; and

"-bitstream-charter-bold-i-normal—0-0-0-0-p-0-iso8859-1".

The suffixes "adobe-fontspecific", "iso8859-1", and "iso8859-5" specify a font encoding scheme and a character set of a particular version of the font. The font encoding scheme is the mapping between character and numeric index for that particular font. When a character is to be displayed, the character drawing routine must convert the numeric index identifying the character to the relevant font glyph index.

The specification of the current locale determines the character encoding scheme which is the same as the font encoding scheme. Only fonts encoded accordingly may be used. A problem arises in that many fonts may not be available with the font encoding scheme required by the current locale.

For example, consider the Solaris™ operating system available from Sun Microsystems™ operating with a Polish language locale specification. This locale specifies the ISO8859-2 font encoding scheme. However, most Polish language fonts may not be available in a version incorporating the ISO8859-2 font encoding scheme. Instead, the fonts have been developed for other platforms that specify other encoding schemes.

A similar problem arises for a user operating a Microsoft Windows X11 server emulator. Because the X Window system requires a single font encoding scheme per locale, the user cannot take advantage of the full range of fonts available under MS Windows if the fonts are encoded using different encoding schemes.

SUMMARY OF THE INVENTION

In accordance with the present invention, translation between a character encoding scheme used by an application and a font encoding scheme used by a character drawing routine may be controlled dynamically so as to accommodate multiple possible font encoding schemes. Accordingly, the range of usable fonts is greatly expanded since more than a single font encoding scheme is supported for a given locale. The process of purchasing and installing new fonts is significantly simplified since any font encoding scheme may be supported.

In one embodiment tailored to the X Window system, X Library function calls are modified to support both the initialization of fonts having disparate font encoding schemes and the dynamically controlled translation between character encoding and font encoding. The X Locale definition database is extended to provide a mapping between font encoding schemes and required translations. This extension to the X Window system preserves backward compatibility and does not affect the operation of existing applications. Changes to external APIs (Application Program Interface) are not required.

A further understanding of the nature and advantages of the inventions herein may be realized by reference to the remaining portions of the specification and the attached drawings.

DESCRIPTION OF SPECIFIC EMBODIMENTS

Figure 1A:
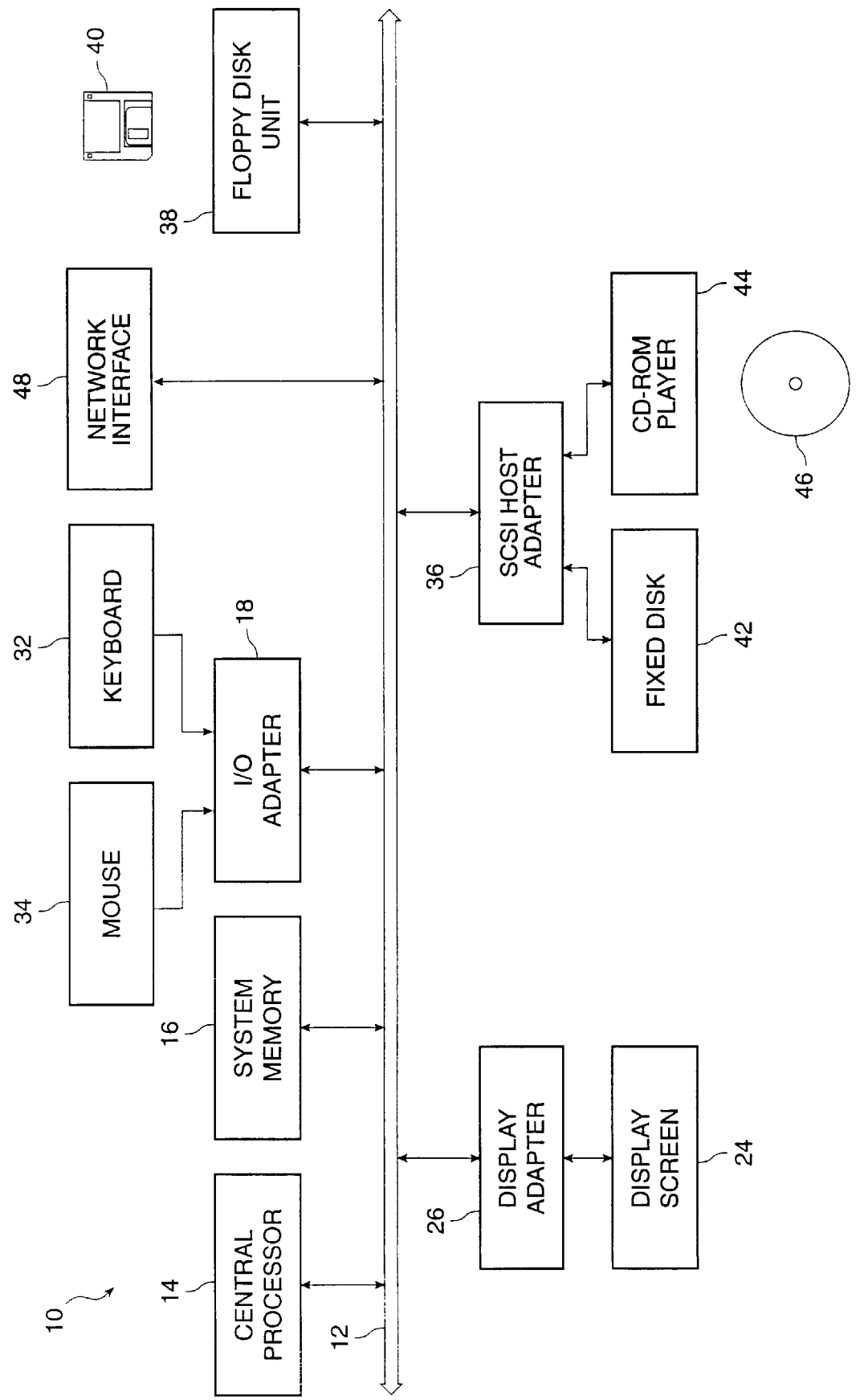
FIG. 1A depicts a block diagram of a computer system suitable for implementing the present invention.

FIG. 1A depicts a block diagram of a host computer system 10 suitable for implementing the present invention. Host computer system 10 includes a bus 12 which interconnects major subsystems such as a central processor 14, a system memory 16 (typically RAM), an input/output (I/O) adapter 18, an external device such as a display screen 24 via display adapter 26, a keyboard 32 and mouse 34 via I/O adapter 18, a SCSI host adapter 36, and a floppy disk drive 38 operative to receive a floppy disk 40. SCSI host adapter 36 may act as a storage interface to a fixed disk drive 42 or a CD-ROM player 44 operative to receive a CD-ROM 46. Fixed disk 44 may be a part of host computer system 10 or may be separate and accessed through other interface systems. A network interface 48 may provide a direct connection to a remote server via a telephone link or to the Internet via a POP (point of presence). Many other devices or subsystems (not shown) may be connected in a similar manner.

Also, it is not necessary for all of the devices shown in FIG. 1A to be present to practice the present invention, as discussed below. The devices and subsystems may be interconnected in different ways from that shown in FIG. 1A. The operation of a computer system such as that shown in FIG. 1A is readily known in the art and is not discussed in detail in this application. Code to implement the present invention, including operating system code, code to implement a windowed user interface, and/or application code may be operably disposed or stored in computer-readable storage media such as system memory 16, fixed disk 42, CD-ROM 46, or floppy disk 40.

Figure 1B:
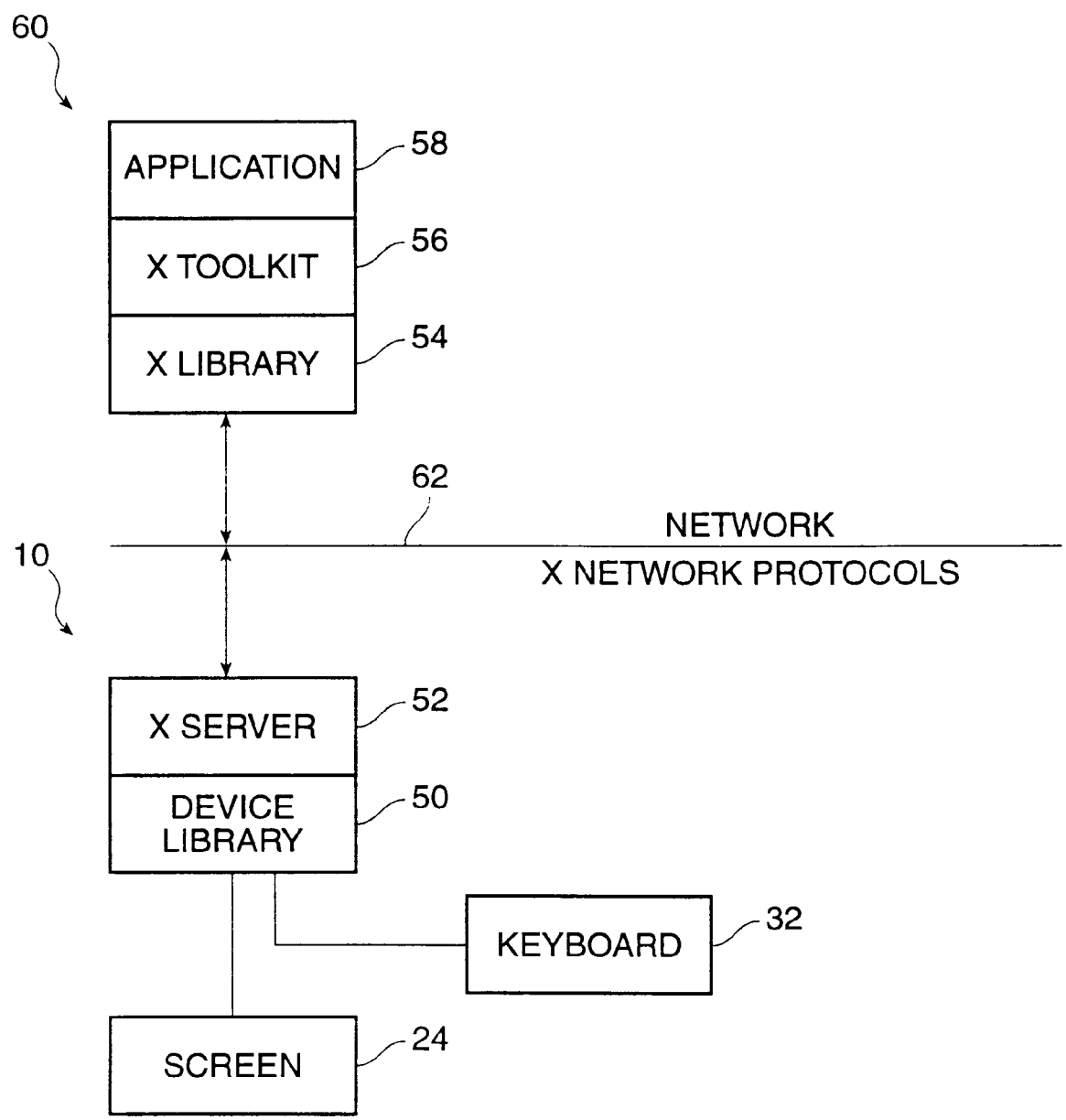
FIG. 1B depicts a functional representation of the operation of an X Window system.

Computer system 10 may by itself implement an X Window system and one or more applications. Alternatively, elements of the X Window system may be located on another part of the network. FIG. 1B depicts a functional representation of the operation of an X-Window system. At the lowest functional level, a device library 50 controls display screen 24 and keyboard 32. An X server 52 performs low level input and output functions such as generation of multifont text and display of text within a hierarchy of rectangular windows by controlling device library 50. X server 52 is itself controlled in accordance with an asynchronous message protocol, X protocol. To simplify the interaction between applications and X server 52, an X Library 54 of higher level input and output functions is provided. X Library 54 simplifies the job of application programmers by hiding the complexity of the X server asynchronous message protocol. An X Toolkit 56 provides even higher level functions and takes advantage of routines of X Library 54. An application 58 may take advantage of routines in either X Toolkit 56 or X Library 54.

FIG. 1B depicts the situation where X Window system functionality is divided between two computer systems connected across a network. Computer system 10 operates only X server 52 and device library 50. X Library 54, X Toolkit 56, and application 58 all operate on a remote computer 60 incorporating some or all of the components of computer system 10. Remote computer 60 and computer system 10 communicate via their respective network interfaces and a network 62 that carries X Protocol messages between X Server 52 and X Library 54. A transport protocol such as TCP may be used to carry the messages. Alternatively, the X Window system may be implemented on a single computer system. However, networking protocols would still be used to connect X Library 54 and X server 52. Further description of the X Window system may be found in Schiefler & Gettys, *X Window System*, 3rd Ed., (Digital Press 1992), the contents of which are herein expressly incorporated by reference for all purposes. Although the discussion will focus primarily on font encoding in the X Window system as an example, the present invention is not limited to any particular environment.

For typical computing environments, the current locale determines the character set and character encoding that applications must employ. Herein, the locale is considered to be the international environment defining the localized behavior at runtime. Examples of possible locales include US ENGLISH, POLISH, etc.

The present invention relates generally to character sets and character encoding. Herein, a character set is considered to be a set of glyphs that is used for graphical representation of characters. The character encoding is an association between these glyphs and integers that represent the glyphs. When an application requests a character to be displayed, it specifies the character using the integer determined by the locale's character encoding.

The library or toolkit routine responds by displaying the character in the selected font. Herein, displaying of characters is considered to encompass printing. The font determines the appearance of the character to be displayed. The appearance information is also indexed by glyph, in accordance with a font encoding for the particular font. Thus, part of the process of drawing a character is translating between a character encoding scheme defined by the current locale and a font encoding scheme of the font. If the encoding schemes are the same, the translation is trivial. In the prior art, the locale determines a single font encoding scheme. Accordingly, the translation between character encoding and font encoding is statically defined. In the X Window system, this static translation takes place within X Library routines used to display characters, e.g, XmbDrawString() or XwcDrawString().

Figures 2, 3:
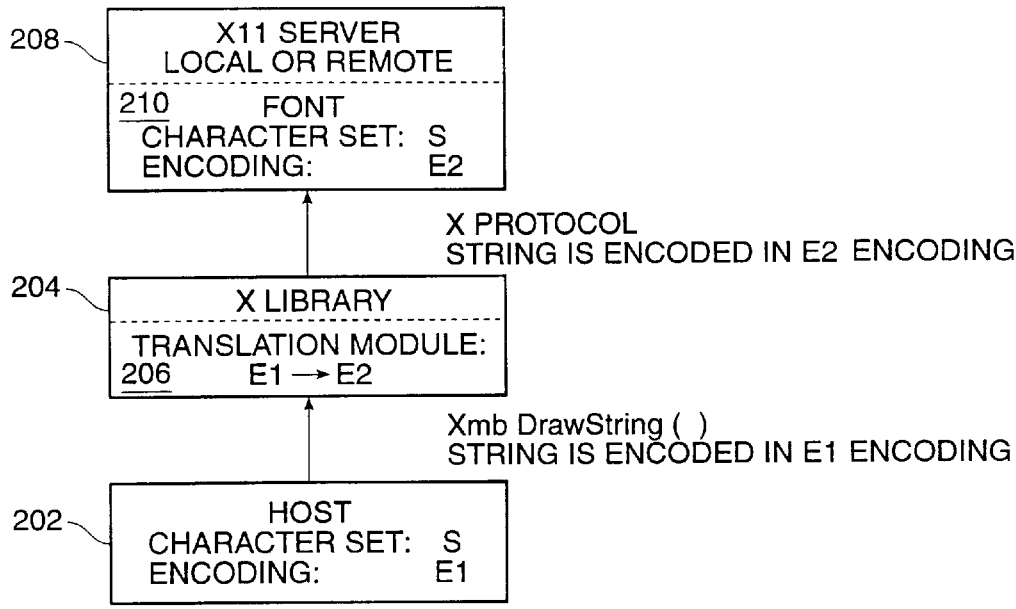
FIG. 2 depicts a block diagram representing font translation in accordance with the present invention.
FIG. 3 depicts an extension to an X Window locale definition database to support dynamic translation between font encoding and character encoding.

FIG. 2 depicts a block diagram representing the translation between character encoding and font encoding in the X Window system. An application 202 running on a host generates a string to be displayed. In accordance with the current locale, application 202 specifies an encoding E1 and a character set S. The host commands the string to be displayed via an XmbDrawString() library call. An X library routine 204 which implements the XmbDrawString() function incorporates a translation module 206 which translates between the character encoding scheme E1 and a font encoding scheme E2 required by the locale. This translation is fixed and constrains the range of permissible fonts to those incorporating font encoding scheme E2. The string to be displayed is forwarded encoded in E2 encoding to an X11 server 208, by employing the X protocol. X11 server 208 may be either local or remote to the other software components. X11 server 208 incorporates a font 210 which includes the appearance information necessary to display the string.

The present invention provides for support of multiple font encoding schemes, thus expanding the range of fonts usable in a given locale. Dynamic translation substitutes for the static translation of the prior art. The translation performed by translation module 206 changes in accordance with the font encoding of the desired font.

In an embodiment directed to the X Window system, dynamic translation is achieved through modification of the locale definition database and to the XmbDrawString() and XwcDrawString() function calls. In an X Window system, the locale definition database includes localization data necessary to support applications and library routines. In accordance with one aspect of the present invention, this locale definition database is extended to incorporate information used to support dynamic translation between font encoding and character encoding.

FIG. 3 depicts an extension to an X Window locale definition database to support dynamic translation between font encoding and character encoding in accordance with one embodiment of the present invention. A data structure 300 entitled XLC_FONTSET includes the information to support dynamic translation. Data structure 300 is divided into two substructures fs0 302 and fs1 304. Assuming an 8 bit character index, substructure fs0 302 gives translation information for indices 0 through 127 while substructure fs1 304 gives translation information for indices 128 through 255. The string appearing to the right of the word "charset" gives the character encoding information for the locale in the form of a character encoding information string. The series of strings appearing to the right of the word "font" gives font encoding information for various font encoding schemes in the form of font encoding information strings. A default font encoding information string appears first in the list.

The following pseudocode segment will clarify the syntax of the encoding information presented in data structure 300:

EncodingInfo ::=EncodingName ["U:" Encodingside] ["=" CodeSetSymbol ]

EncodingName ::=CHARSET_REGISTRY-CHARSET_ENCODING

EncodingSide ::="GL" | "GR"

CodeSetSymbol ::=String8.

Every encoding information string includes an EncodingName string variable identifying a character set and character set encoding. Furthermore, the encoding information string optionally includes an EncodingSide string variable. The EncodingSide of the character is determined by its most significant bit (MSB). Characters with MSB 0 are called "GL" characters. Characters with MSB 1 are called "GR" characters. EncodingName and EncodingSide are delimited by ":" in the encoding information string. The encoding information string may further include a CodeSetSymbol which is a pointer to a codeset used for translation between different character encodings. An "=" precedes the CodeSetSymbol.

Figure 4:
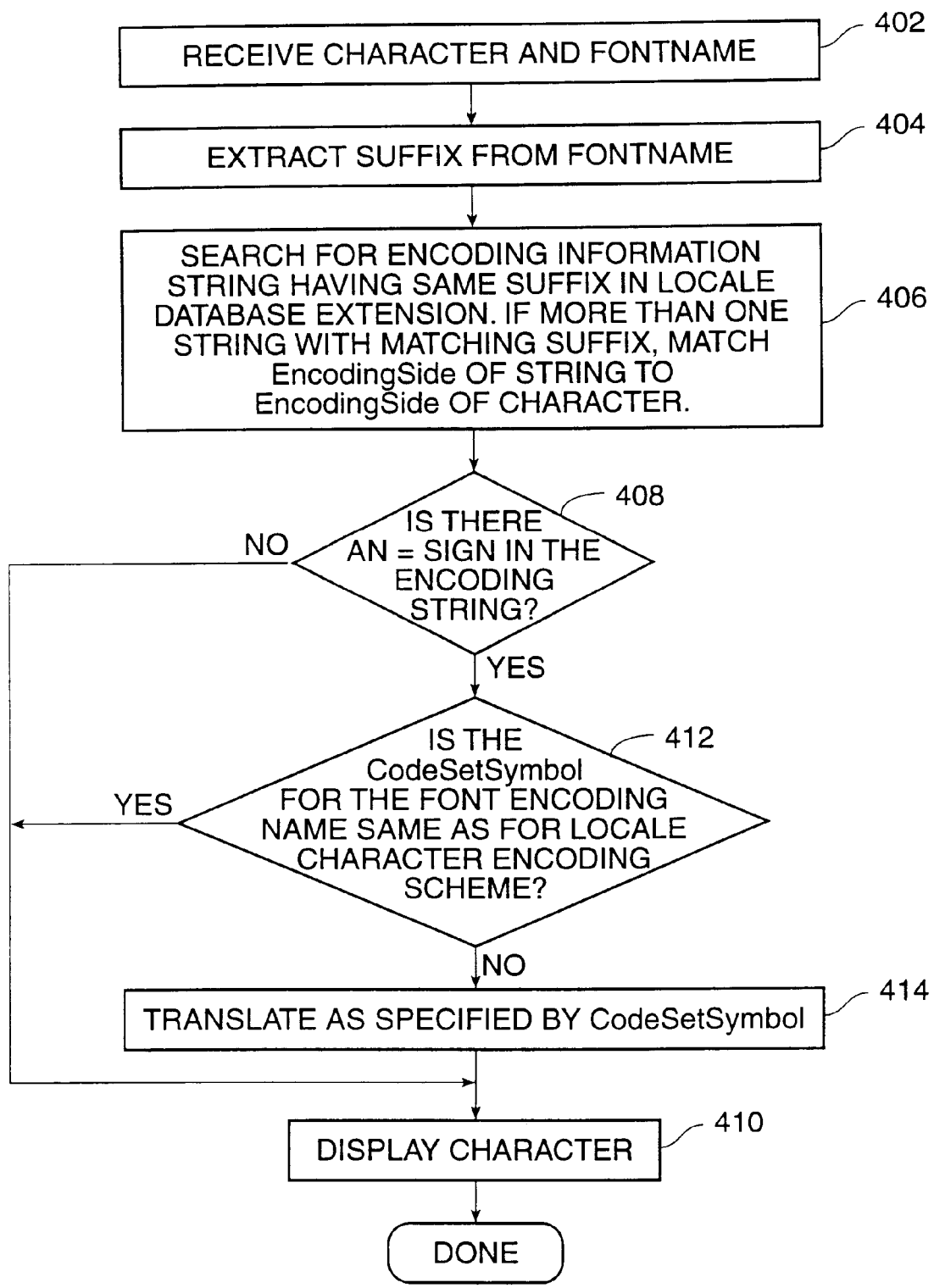
FIG. 4 is a flowchart describing steps of dynamically controlling translation between a locale-specific character encoding scheme and a font encoding scheme.

FIG. 4 is a flowchart describing steps of dynamically controlling translation between a character encoding scheme and a font encoding scheme in accordance with one embodiment of the present invention. At step 402, translation module 206 receives a character to be displayed and a font name specifying a desired appearance of the character. The character is specified in terms of a character encoding scheme determined by the locale. In the X Window system, the font name is an XLFD-compliant font name. Examples of XLFD-compliant font names include:

- "-adobe-symbol-medium-r-normal—0-0-0-0-p-0-adobe-fontspecific";
- "-b&h-lucida-bold-r-normal-sans-0-0-0-0-m-0-iso8859-5"; and
- "-bitstream-charter-bold-i-normal—0-0-0-0-p-0-iso8859-1".

The suffixes "adobe-fontspecific", "iso8859-1", and "iso8859-5" specify a font encoding scheme and a character set of a particular version of the font. At step 404, translation module 206 extracts the suffix to identify the encoding scheme. At step 406, translation module 206 searches data structure 300 for a font encoding information string that includes the font name suffix as an EncodingName. If there is more than one such string, step 406 selects the string including the same EncodingSide as the character. In particular, the portions of data structure 300 following the word "font" are searched. The search proceeds from top to bottom and from left to right. Thus, if the default font encoding information string for the locale matches, it is selected. At step 408, translation module 206 checks if there is an "=" sign in the selected string indicating that the encoding information string further incorporates a CodeSetSymbol which points to a codeset for translation.

If no codeset for translation is specified, no conversion is necessary and translation module 206 forwards the character to the X11 server for display at step 410. If a codeset is specified, at step 412 translation module 206 compares the CodeSetSymbol specified by the font encoding information string to the CodeSetSymbol specified by the encoding information string corresponding to the locale and the EncodingSide for the character to be displayed. Recall that in FIG. 3, the encoding information string for the locale is given after the word "charset" and is indicated separately for GL and GR characters. If the CodeSetSymbols are the same, again there is no need for conversion and the character is displayed at step 410.

If the CodeSetSymbols are not the same, translation module 206 performs a conversion. This can be done in a variety of ways at step 414. One way is invoking the well-known iconv(3) conversion mechanism. The input to the iconv(3) conversion mechanism is the character index provided by the application, the name of the encoding, defined by the CodeSetSymbol of the font encoding information string, and the name of the encoding, defined by the CodeSetSymbol of the locale encoding information string. The CodeSetSymbols logically identify the encoding tables used for translation. The output of the iconv(3) conversion mechanism is the converted character index which is displayed at step 414.

It can be seen that the procedure of FIG. 4 first identifies the needed translation information to convert the character index into the font encoding scheme of the display font and then performs the translation. A pair of examples will clarify this procedure. Assume that the cyrillic character "TE" (having appearance identical to the latin character "T") is to display in the font specified by XLFD-compliant font name "b&h-lucida-bold-r-normal-sans-0-0-0-0-m-0-koi-8" and that the current locale is RUSSIAN. Further assume that the locale definition database includes the example extension depicted in FIG. 3. At step 402, translation module 206 receives the font name and the index for "TE", 194 as determined for the RUSSIAN locale. At step 404, translation module 206 extracts the suffix "koi-8" from the font name which determines the font encoding scheme and character set for the display font. At step 406, translation module 206 searches data structure 300 for a font encoding information string including the EncodingName "koi-8". Since the character index 194 corresponds to a GR character (MSB is 1), the search of step 406 is limited to font encoding information strings specifying the "GR" EncodingSide. The search identifies the font encoding information string "KOI-8:GR= koi8". At step 408, translation module 206 finds that there is an "=" in the font encoding information string. The CodeSetSymbol of this font information string is "koi8".

The locale character encoding information string for the "GR" EncodingSide is "ISO8859-5:GR=isolatcyr". Thus, the CodeSetSymbol for this locale and EncodingSide is "isolatcyr". At step 412, translation module 206 finds that the CodeSetSymbols "isolatcyr" and "koi-8" are in fact different and that translation is therefore required. Thus, at step 414, translation module 206 invokes the iconv(3) mechanism providing the CodeSetSymbols and the character index 194 as input. The iconv(3) mechanism returns the index 244. The index 244 is then forwarded to the X11 server for display.

Close examination of FIG. 3 will show that in the depicted example, translation is never necessary for the "GL" EncodingSide. This is typically true because encoding schemes do not differ from one another for the first 128 glyphs. Consider a RUSSIAN locale example where the latin character "T" is to be displayed in the font specified by the XLFD-compliant font name "b&h-lucida-bold-r-normal-sans-0-0-0-0-m-0-koi-8". At step 404, the suffix "koi-8" is extracted. At step 406, the font encoding information string "KOI-8:GL" is identified. At step 408, there is no "=" sign after the EncodingSide so processing proceeds to step 410 where character code 84 is displayed without translation.

In the X Window environment, the steps of FIG. 4 may be implemented as a modification to the XmbDrawString() and XwcDrawString() routines in X Library. Preferably, the XCreateFontSet() routine of X Library should also be modified. The XCreateFontSet() routine is typically invoked to load fonts. Prior art implementations of XCreateFontSet() permitted loading only of fonts having the unique font encoding scheme required by the locale. To accommodate the dynamic font encoding translation provided by the present invention, XCreateFontSet() is preferably modified to permit loading of fonts having font encoding schemes for which translation information is available. This is easily determined with examination of locale definition database extension described in reference to FIG. 3.

In the foregoing specification, the invention has been described with reference to specific exemplary embodiments thereof. It will, however, be evident that various modifications and changes may be made thereunto without departing from the broader spirit and scope of the invention as set forth in the appended claims.

For example, although some of the details of the implementation described above pertain to the X Window system, the X Window system is merely representative of environments where the present invention will find application.

Furthermore, the flowcharts described herein are illustrative of merely the broad logical flow of steps to achieve a method of the present invention and that steps may be added to, or taken away from the flowchart without departing from the scope of the invention. Further, the order of execution of steps in the flowcharts may be changed without departing from the scope of the invention. Additional considerations in implementing the method described by the flowchart may dictate changes in the selection and order of steps.

In general, the flowcharts in this specification include one or more steps performed by software routines executing in a computer system. The routines may be implemented by any means as is known in the art. For example, any number of computer programming languages, such as Java, "C", Pascal, FORTRAN, assembly language, etc., may be used. Further, various programming approaches such as procedural, object oriented or artificial intelligence techniques may be employed.

Many such changes or modifications will be readily apparent to one of ordinary skill in the art. The specification and drawings are, accordingly, to be regarded in an illustrative rather than a restrictive sense, the invention being limited only by the provided claims and their full scope of equivalents.

What is claimed is:

1. A computer-implemented method for supporting display of fonts having multiple character encoding schemes comprising:

receiving a character index specifying a character to be displayed in accordance with a character encoding scheme;

receiving font information specifying a font in which said character is to be displayed said font employing a font encoding scheme;

if said character encoding scheme is not compatible with said font encoding scheme, identifying translation information for translating said character encoding scheme into said font encoding scheme employed by said font; and translating said character index from said character encoding scheme into said font-encoding scheme in accordance with said identified translation information.

2. The method of claim 1 wherein said identifying step comprises:

searching a database for a location indicator identifying said translation information using a name of said font encoding scheme as a key.

3. The method of claim 2 wherein said font information comprises a font name and said searching step comprises:

extracting said name of said font encoding scheme from a suffix of said font name.

4. The method of claim 2 wherein said database comprises a locale definition database.

5. The method of claim 1 wherein said receiving, identifying, and translating steps are implemented within a character drawing routine.

6. The method of claim 1 wherein said character drawing routine comprises an X Library character drawing routine.

7. A computer program product for supporting display of fonts having multiple character encoding schemes comprising:

code for receiving a character index specifying a character to be displayed in accordance with a character encoding scheme;

code for receiving font information specifying a font in which said character is to be displayed, said font employing a font encoding scheme;

if said character encoding scheme is not compatible with said font encoding scheme, code for identifying translation information for translating said character encoding scheme into said font encoding scheme employed by said font;

code for translating said character index from said character encoding scheme into said font encoding scheme in accordance with said identified translation information; and a computer-readable storage medium that stores said codes.

8. The product of claim 7 wherein said identifying code comprises:

code for searching a database for a location indicator identifying said translation information using a name of said font encoding scheme as a key.

9. The product of claim 8 wherein said font information comprises a font name and said searching code comprises:

code for extracting said name of said font encoding scheme from a suffix of said font name.

10. The product of claim 8 wherein said database comprises a locale definition database.

11. The product of claim 7 wherein said receiving, identifying, and translating codes are incorporated within a character drawing routine.

12. The product of claim 7 wherein said character drawing routine comprises an X Library character drawing routine.

13. A computer program product for supporting display of fonts having multiple character encoding schemes comprising:

system code comprising code for displaying a selected character, said displaying code comprising:

code for receiving a character index specifying a character to be displayed in accordance with a character encoding scheme;

code for receiving font information specifying a font in which said character is to be displayed, said font employing a font encoding scheme;

if said character encoding scheme is not compatible with said font encoding scheme, code for identifying translation information for translating said application character encoding scheme into said font encoding scheme employed by said font;

code for translating said character index from said character encoding scheme into said font encoding scheme in accordance with said identified translation information; and a computer-readable storage medium that stores said codes.

14. The product of claim 13 wherein said identifying code comprises:

code for searching a database for a location indicator identifying said translation information using a name of said font encoding scheme as a key.

15. The product of claim 14 wherein said font information comprises a font name and said searching code comprises:

code for extracting said name of said font encoding scheme from a suffix of said font name.

16. The product of claim 14 wherein said database comprises a locale definition database.

17. A computer system comprising:

a display interface;

a processor;

an electronic storage medium;

code stored on said electronic storage medium comprising:

code for receiving a character index specifying a character to be displayed in accordance with a character encoding scheme;

code for receiving font information specifying a font in which said character is to be displayed, said font employing a font encoding scheme;

if said character encoding scheme is not compatible with said font encoding scheme, code for identifying translation information for translating said character encoding scheme into said font encoding scheme employed by said font; and code for translating said character index from said character encoding scheme into said font encoding scheme in accordance with said identified translation information.

18. A computer system comprising:

a network interconnecting a first computer system and a second computer system;

said first computer system comprising:

a first network interface coupled to said network;

a first electronic storage medium;

code stored on said first electronic storage medium comprising:

code for receiving a character index specifying a character to be displayed in accordance with a character encoding scheme;

code for receiving font information specifying a font in which said character is to be displayed, said font employing a font encoding scheme;

if said character encoding scheme is not compatible with said font encoding scheme, code for identifying translation information for translating said character encoding scheme into said font encoding scheme employed by said font; and code for translating said character index from said character encoding scheme into said font encoding scheme in accordance with said identified translation information; and code for forwarding said translated character index to said first computer system via said first network interface and said network; and said second computer system comprising:

a second network interface coupled to said network;

a display;

a second electronic storage medium comprising:

code stored on said second electronic storage medium comprising:

code for receiving said translated character index via said second network interface; and code for displaying a character in accordance with said translated character index.

\* \* \* \* \*